United States Patent
Bejot

(10) Patent No.: US 10,409,456 B2
(45) Date of Patent: Sep. 10, 2019

(54) DYNAMICALLY CHANGING A 3D OBJECT INTO AN INTERACTIVE 3D MENU

(71) Applicant: Disney Enterprises, Inc., Burbank, CA (US)

(72) Inventor: Jason Bejot, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 528 days.

(21) Appl. No.: 14/734,278

(22) Filed: Jun. 9, 2015

(65) Prior Publication Data
US 2016/0364088 A1 Dec. 15, 2016

(51) Int. Cl.
G06F 3/0482 (2013.01)
G06F 3/0484 (2013.01)
G06F 3/0481 (2013.01)

(52) U.S. Cl.
CPC ........ G06F 3/0482 (2013.01); G06F 3/04815 (2013.01); G06F 3/04842 (2013.01)

(58) Field of Classification Search
CPC . G06F 3/0482; G06F 3/04815; G06F 3/04847
USPC ....................................................... 715/810
See application file for complete search history.

(56) References Cited

U.S. PATENT DOCUMENTS

| 5,724,492 A * | 3/1998 | Matthews, III ....... G06F 3/0482 345/419 |
| 7,043,695 B2 * | 5/2006 | Elber ...................... G06T 17/00 345/418 |
| 2009/0096812 A1 * | 4/2009 | Boixel .................... G06Q 10/00 345/646 |
| 2010/0150526 A1 * | 6/2010 | Rose ....................... G06T 13/00 386/352 |
| 2014/0237366 A1 * | 8/2014 | Poulos .................... G06F 3/013 715/728 |

* cited by examiner

Primary Examiner — Nicholas McFall
Assistant Examiner — Terri L Filosi
(74) Attorney, Agent, or Firm — Patterson + Sheridan, LLP

(57) ABSTRACT

Techniques disclosed herein describe rendering a 3D menu object in a scene, e.g., from other 3D objects in the scene. A menu component receives a selection of a point-of-origin in a 3D geometric scene having 3D objects. The menu component retrieves predefined menu items and renders, from the selected point-of-origin, the 3D menu object. The 3D menu object presents a selectable list of the predefined menu items.

20 Claims, 8 Drawing Sheets

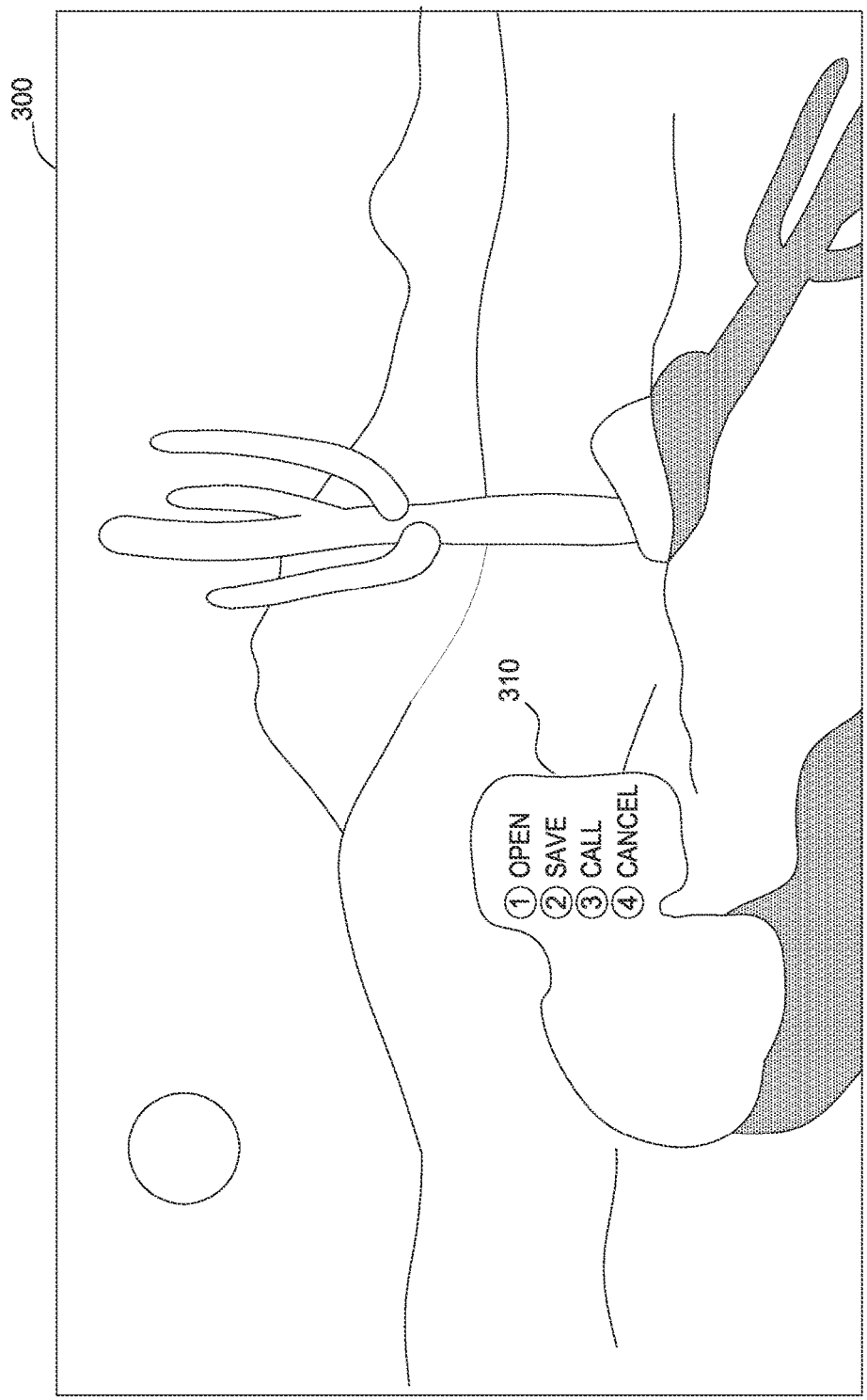

DYNAMICALLY CHANGING A 3D OBJECT INTO AN INTERACTIVE 3D MENU

BACKGROUND

Field

Embodiments presented herein generally relate to three dimensional (3D) computer graphics, and more specifically, to rendering an interactive 3D menu in a scene.

Description of the Related Art

Advances in computer graphics have provided individuals with immersive virtual experiences. For instance, gaming systems are often configured with powerful graphics processing units (GPUs) capable of rendering numerous three-dimensional (3D) objects in a geometric scene. Gaming systems use virtual reality technology to create a virtual environment presented to an individual interacting with the virtual environment. More generally, virtual reality (VR) systems render 3D objects in the virtual environment, allowing individuals to interact with the 3D objects as if the individual were actually within the environment.

Gaming environments, such as those provided in VR systems, typically include a menu system. The menu system offers individuals with options based on an associated context. An example menu might present the user with options related to save game mechanics, such as creating a save state, opening a save state, etc. Another example menu might present the user with options related to the gaming experience itself. In this example, assume that the individual can interact with different objects in a field-of-view (FOV). The individual may select a given object (e.g., by pointing to the object with some controller device), and in response, the gaming environment may present the individual with a menu of options for interacting with the object, such as picking up the object, striking the object, etc.

SUMMARY

One embodiment presented herein generally describes a method for rendering a three-dimensional (3D) menu object in a scene. The method generally includes receiving, via a processor, a selection of a point-of-origin in a 3D geometric scene having a plurality of 3D objects. One or more predefined menu items are retrieved. The method also generally includes rendering, from the selected point-of-origin, a first 3D object presenting a selectable list of the predefined one or more menu items.

Another embodiment presented herein generally describes a computer-readable medium that includes instructions that enable a processing unit perform an operation for rendering a three-dimensional menu object in a scene. The operation generally includes receiving, via a processor, a selection of a point-of-origin in a 3D geometric scene having a plurality of 3D objects. One or more predefined menu items are retrieved. The operation also generally includes rendering, from the selected point-of-origin, a first 3D object presenting a selectable list of the predefined one or more menu items.

Another embodiment presented herein generally describes a system having a processor, memory, and application programs configured to perform an operation for rendering a three-dimensional menu object in a scene. The operation generally includes receiving, via a processor, a selection of a point-of-origin in a 3D geometric scene having a plurality of 3D objects. One or more predefined menu items are retrieved. The operation also generally includes rendering, from the selected point-of-origin, a first 3D object presenting a selectable list of the predefined one or more menu items.

BRIEF DESCRIPTION OF THE DRAWINGS

So that the manner in which the above recited aspects are attained and can be understood in detail, a more particular description of the present disclosure, briefly summarized above, may be had by reference to the appended drawings.

It is to be noted, however, that the appended drawings illustrate only typical embodiments of the present disclosure and are therefore not to be considered limiting of its scope, for the present disclosure may admit to other equally effective embodiments.

FIGS. 3A-3C illustrate an example rendering of a 3D menu object from an existing object in a geometric scene, according to one embodiment.

DETAILED DESCRIPTION

Figure 1:
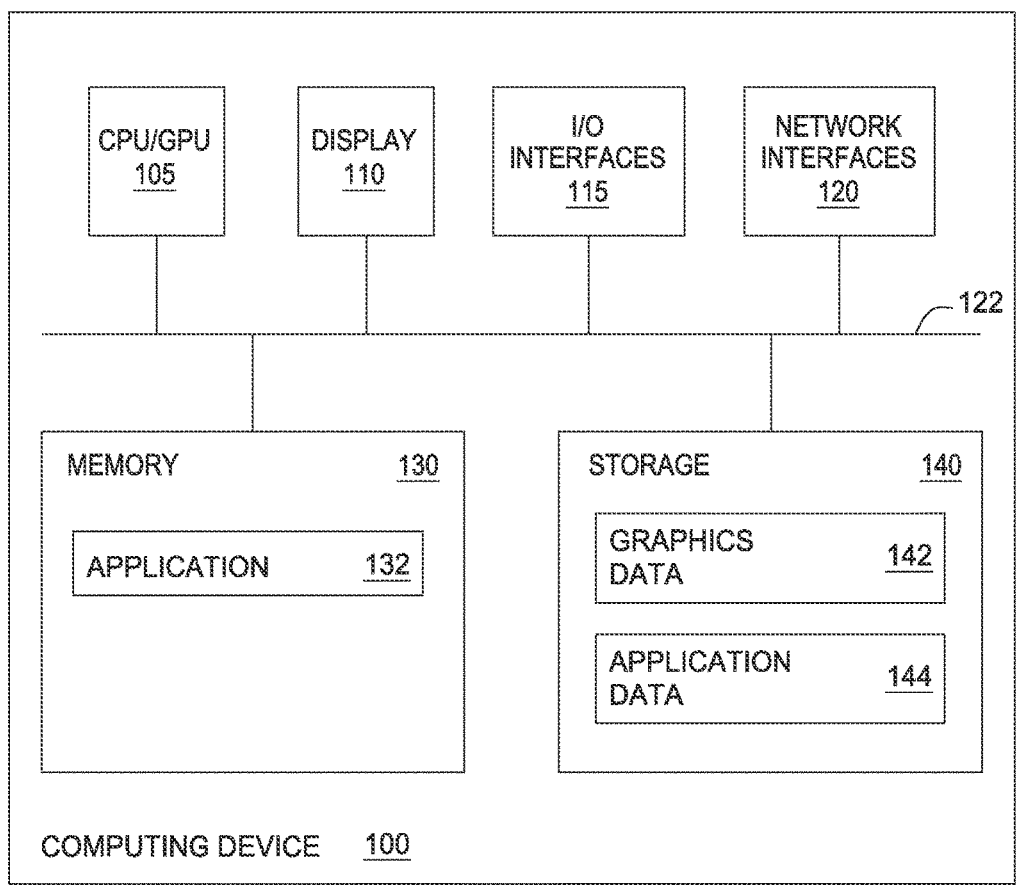
FIG. 1 illustrates an example computing device, according to one embodiment.

Typically, menu systems in a three-dimensional (3D) graphics environment often present a menu as a two-dimensional (2D) menu screen having 2D graphics and text. For example, in a virtual reality (VR) environment, a gaming application may overlay a heads-up display (HUD) representing a menu in front of the field-of-view (FOV) of a user. A menu screen can be intrusive and distracting, particularly in gaming experiences that aim to immerse the user in an artificial environment. As a result, the current approach to providing a menu to a user in a 3D graphics environment can affect an overall experience for the user.

Embodiments presented herein describe techniques for rendering a 3D interactive menu in a 3D geometric scene. In one embodiment, an application provides a 3D gaming experience to a user. The application may execute on a VR system, where the user engages in an artificial environment, e.g., using a VR headset. The application immerses the user in the environment via a field-of-view (FOV) of the user, to give the user the feeling of actually being part of the environment. Further, the gaming environment may include multiple 3D objects (e.g., people, rocks, trees, animals, etc.) rendered in a 3D geometric scene.

In one embodiment, the application includes a menu component. The menu component may be a part of a graphics engine of the application. The menu component renders a 3D menu within the geometric scene at a selected point-of-origin of the scene. The point-of-origin may be user-selected, selected via game logic (e.g., as part of a scripted sequence), etc. In each of these cases, the menu component receives a selection of a point-of-origin within the scene. The menu component determines whether the point-of-origin is associated with a menu context. The menu context may associate one or more predefined menu items with a given point-of-origin (or the overall 3D scene). If the point-of-origin is associated with a menu context, then the menu component retrieves the associated menu items and generates a 3D menu object from the point-of-origin. The 3D menu object includes a selectable list of the associated menu items.

In some cases, the selected point-of-origin is located on a previously-rendered 3D object in the scene. In such an event, the menu component renders the 3D menu from the point-of-origin of that object. In doing so, the menu component transforms the previously-rendered 3D object into the 3D menu. The menu component may transform the entire 3D object or portions (e.g., faces of the 3D object) to the 3D menu. The menu component may animate the transformation sequence to provide seamless menu access for the user.

In one embodiment, to provide further seamless menu access, the menu component may readjust rendered elements of other 3D objects in the scene after rendering the 3D menu. For example, the menu component may readjust lighting elements to account for shadows cast by the 3D menu.

Advantageously, rendering a 3D menu directly in a 3D geometric scene enhances a user experience in a 3D environment. A user may arbitrarily select a 3D object in the scene, and the menu component transforms that 3D object into a 3D menu object that provides selectable options for the user. Further, because the menu component renders the menu seamlessly in the scene, the application does not need to change the user's current experience (e.g., by switching to a 2D menu screen), thus allowing the user to remain immersed in the 3D environment relatively uninterrupted.

Note, the following uses a virtual reality (VR) gaming system as an example of a system that executes 3D graphics applications configured to generate 3D menu objects in a geometric scene. However, one of skill in the art will recognize that embodiments presented herein may be adapted to a variety of systems and applications that render multiple 3D objects in a geometric scene. For example, the techniques described herein may be adapted to console gaming applications that render 3D scenes in a gaming environment. As another example, embodiments presented herein may be adapted to a holographic display device that renders, over a physical area, one or more 3D holographic objects. The holographic display device may receive an input selection of one of the 3D holographic objects, e.g., via an unaided finger or hand of a user. In turn, the holographic display device can determine a given context of the object and identify menu items associated with the context. Thereafter, the holographic display device can manipulate the selected 3D object into a rendered 3D menu object.

FIG. 1 illustrates an example computing device 100, according to one embodiment. As shown, the computing device 100 includes a CPU/GPU (central processing unit/graphics processing unit) 105, a display 110, I/O interfaces 115, a network interface 120, memory 130, a storage 140, and a bus 122. The computing device 100 is representative of a variety of computing systems, e.g., a gaming console, a handheld console, a smartphone, or variety of other computing devices capable of rendering graphics data. In one embodiment, the computing device 100 represents a virtual reality (VR) gaming system. Further, the computing device 100 may be a headset worn by a user. The user may view rendered graphics via the display 110. In one embodiment, components of the computing device 100 may be spread across a number of individual devices. For example, a headset device may contain the display 100 and connect to a computing device that includes the CPU/GPU 105, I/O interfaces 115, memory 130, storage 140, etc.

The CPU/GPU 105 are programmable logic devices that execute instructions, logic, and mathematical processing, and may be representative of one or more CPUs, multi-core CPUs, and/or GPUs, and the like. The bus 122 is used to transmit programming instructions and application data between the CPU/GPU 105, the display 110, the I/O interfaces 115, the network interface 120, the memory 130, and the storage 140. The memory 130 represents any memory sufficiently large to hold applications (e.g., application 132) and data structures associated with the applications. Memory 130 could be one or a combination of memory devices, including Random Access Memory (e.g., DRAM modules), nonvolatile or backup memory (e.g., programmable or Flash memories, read-only memories, etc.). Storage 208 is included to be representative of hard-disk drives, solid-state drives (SSD), flash memory devices, optical media (e.g., CD/DVD/Blu-Ray® discs) and the like.

The I/O interfaces 115 allow controller devices or other types of input devices (not shown) to connect to the computing device 100. A user may control gameplay (e.g., in the application 132) via such input devices. The network interface 120 connects the computing device 100 to a network (e.g., the Internet). Once connected, the network interface 120 transmits and receives data between the computing device 100 and the network.

Illustratively, memory 130 includes an application 132. And storage 140 includes graphics data 142 and application 144. In one embodiment, the application 132 provides a virtual 3D gaming environment to a user. The application 132 includes a graphics engine that manipulates graphics data 142 (e.g., elements, geometries, artifacts, etc.) to create 3D geometric scenes that include multiple 3D objects. The application 132 may provide gaming sequences for the user through the application data 144.

Figure 2:
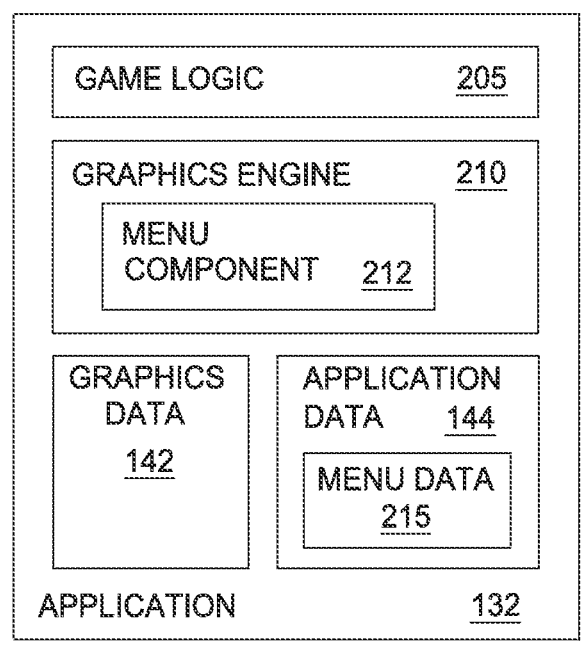
FIG. 2 further illustrates the application described relative to FIG. 1, according to one embodiment.

FIG. 2 further illustrates the application 132, according to one embodiment. As shown, the application 132 includes graphics data 142 and application data 144. The application 132 further includes game logic 205 and a graphics engine 210. The game logic 205 provides game rules, goals, scripted sequences, environment information, and the like. The game logic 205 also provides contexts associated with a given geometric scene or objects within the scene.

The graphics engine 210 renders 3D objects and geometry from graphics data 142. Further, the graphics engine may use a physics engine to provide a realistic sense of the laws of physics between 3D objects in a scene. In addition, the physics engine may manipulate the 3D objects to provide a fantastical sense of the laws of physics. The graphics engine 210 may render a given object or scene in response to context or instructions provided by the game logic 205. The scene itself may be presented within a field-of-view (FOV) of the user.

In one embodiment, the graphics engine 210 includes a menu component 212. The menu component 212 renders a 3D menu object from a selected point-of-origin in the scene. Further, the menu component 212 may transform the 3D menu object from a previously-rendered object using various 3D morphing techniques. The menu component 212 may transform the entire rendered object or faces of the rendered object to the 3D menu. Once rendered, the menu component 212 may use readjust elements previously rendered in the scene, such as object physics, and lighting effects on objects.

To generate a 3D menu object within a scene, the menu component 212 receives a selection at a point-of-origin in the scene. The selection may be initiated by a user or by the game logic 205. Further, the point-of-origin may be located anywhere within the scene, even outside of the FOV of the user. For instance, the point-of-origin can be located on a rendered 3D object or mid-air.

Based on the location of the point-of-origin, the menu component 212 evaluates the game logic 205 to determine any context associated at the location of the point-of-origin. A context itself may be associated with a given set of menu data 215. The menu data 215 includes menu items that may be presented to a user based on the context of the scene. For example, a context associated with a point-of-origin in mid-air may be associated with menu items related to game mechanics (e.g., creating a save state, opening a save state, exiting the application 132, etc.). As another example, a context associated with a point-of-origin located on a 3D object may be associated with menu items related to engaging that 3D object (e.g., searching the object, striking the object, talking to the object, etc.).

If a context is associated with menu items, the menu component 212 retrieves the items from the menu data 215. The menu component 212 then renders the 3D menu object from the point-of-origin. The 3D menu object includes the items retrieved from the menu data 215. The 3D menu object may be generated from geometric elements in the graphics data 142. Further, the menu component 212 may readjust currently-existing elements (e.g., lighting, physics, occlusion) to account for the 3D menu object. For example, assume that the 3D menu object is rendered mid-air above an existing 3D object. The menu component 212 may adjust lighting properties of the existing 3D object such that the 3D menu object casts a shadow over the object.

In one embodiment, the menu component 212 transforms an existing 3D object to the 3D menu object if the point-of-origin is located on that 3D object. To do so, the menu component 212 may perform various morphing techniques on the 3D object. Further, the menu component 212 may also animate the transformation in real-time. Doing so allows the transition from 3D object to 3D menu object to appear seamless to the user. Once rendered, the 3D menu object provides the associated menu items that are selectable by the user. After the menu component 212 receives a selection, the menu component 212 may close the menu, e.g., by transforming the 3D menu object to the previous object, using the same morphing techniques.

Figure 3A:
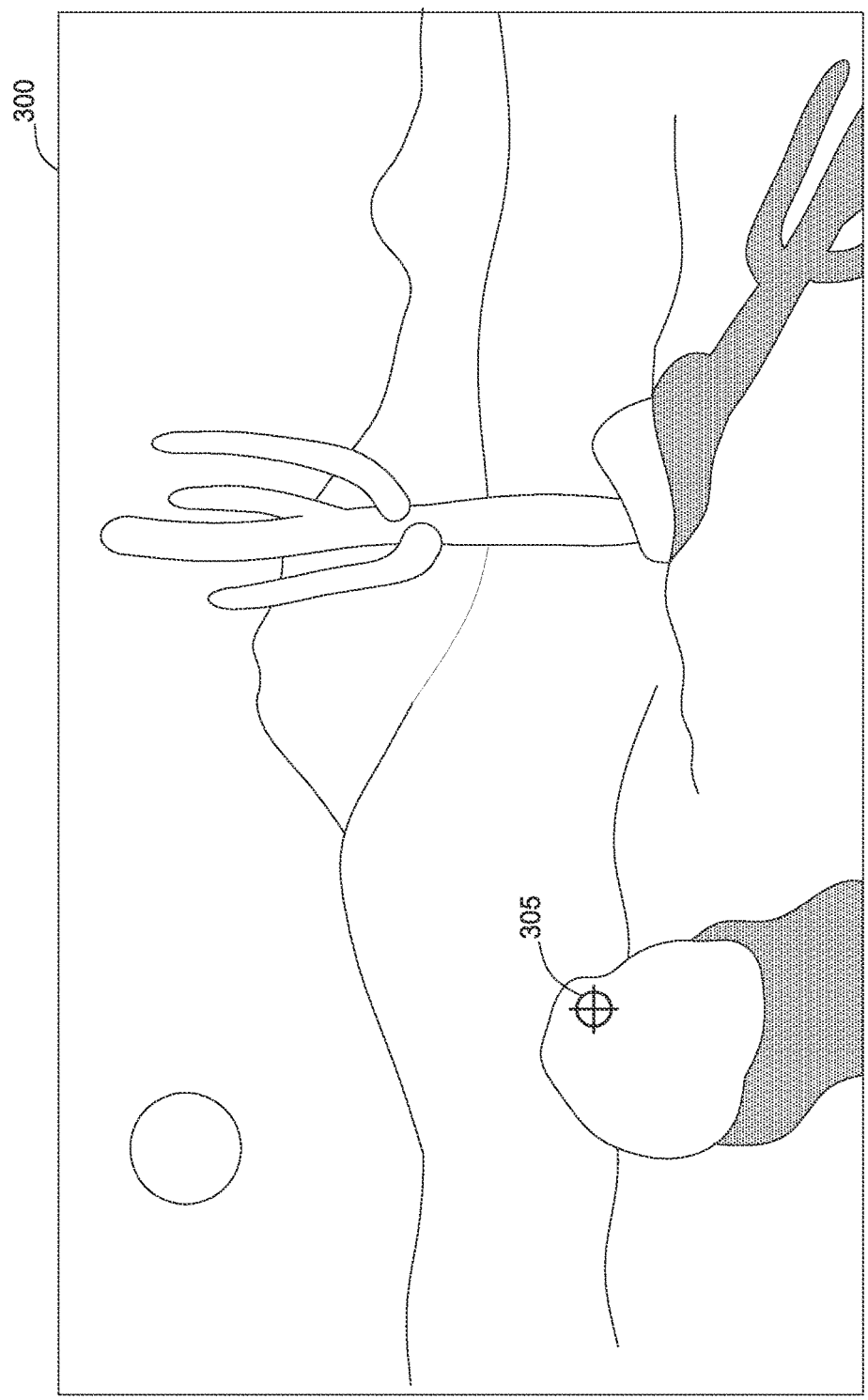
Figure 3B:
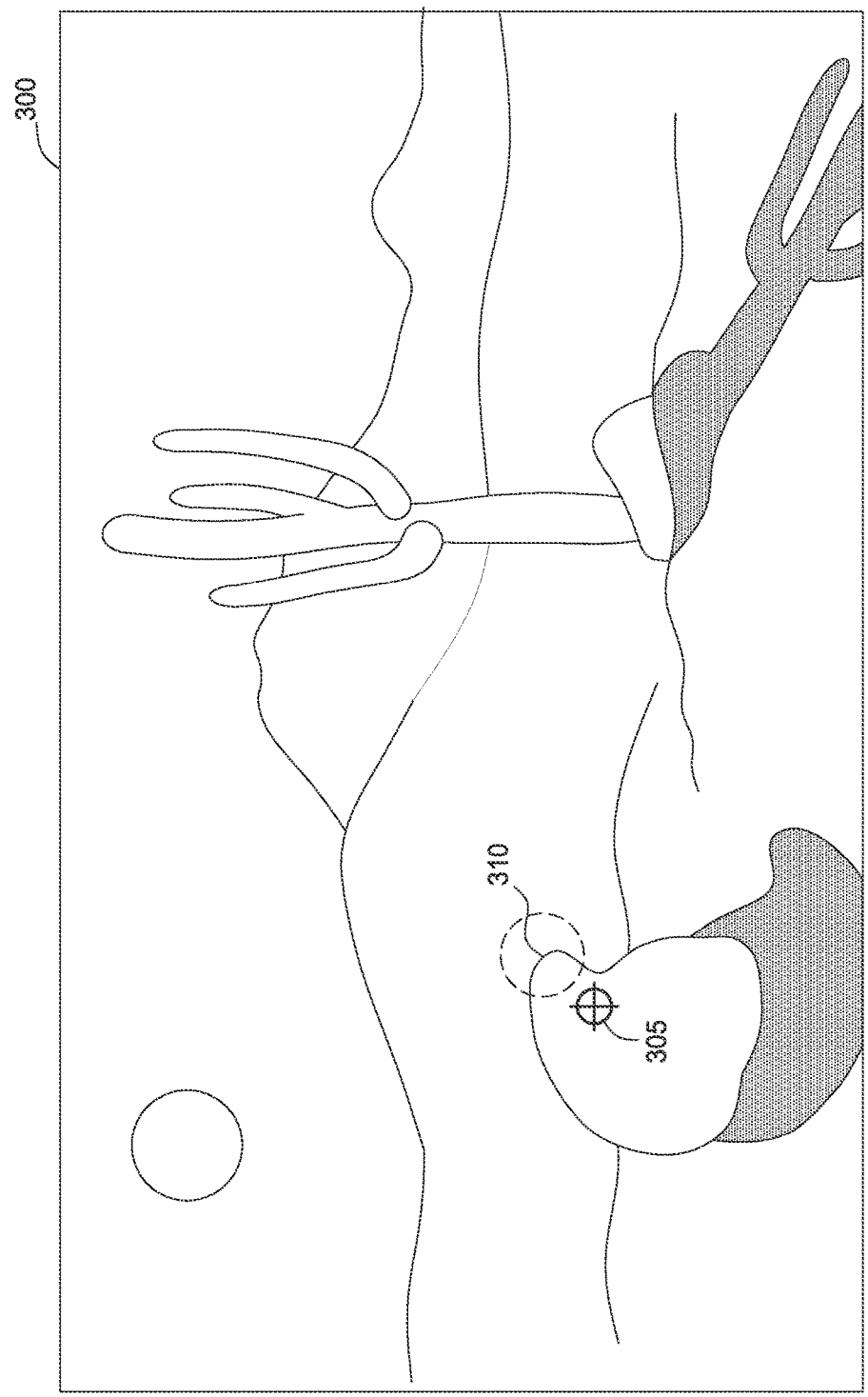

FIGS. 3A-3C illustrate an example rendering of a 3D menu object from a previously-rendered 3D object in a scene 300, according to one embodiment. In this example, the scene 300 represents a field-of-view (FOV) provided on the display 110 of the computing device 100 for a user. Illustratively, the scene 300 depicts a view of a 3D environment of a desert. The scene 300 includes several rendered 3D objects, such as a boulder and cactus.

As stated, the menu component 212 can generate a 3D menu object from any location and from any object of a given scene, even if the location or object of the scene is outside of the FOV presented on the display 110. In this example, FIG. 3A depicts the user selecting the point-of-origin 305, represented by the cross-hair, on the boulder in the scene 300. The menu component 212 receives the selection and determines that the object at the point-of-origin 305 is associated with a context (specified in the game logic 205). The menu component 212 then determines that the context is associated with a set of menu items. The menu component 212 retrieves the menu items and begins to transform the boulder from the point-of-origin 305.

FIG. 3B depicts the menu component 212 transforming the boulder object into the 3D menu object from the point-of-origin 305. In particular, FIG. 3B depicts the object mid-morph at portion 310 (represented by the dotted circle). As stated, the menu component 212 may readjust elements of the scene 300 to account for the appearance of the 3D menu object. For instance, illustratively, the portion 310 casts a shadow.

FIG. 3C depicts a 3D menu object 310 rendered in the scene 300 from the selected point-of-origin. Illustratively, the 3D menu object 310 protrudes from the previously-rendered boulder object. The 3D menu object 310 includes a list of selectable menu items, namely, "Open," "Save," Call," and "Cancel." In addition, the menu component 212 readjusts elements of the scene 300 to account for the appearance of the 3D menu object. Illustratively, the 3D menu object 310 casts a shadow.

Figure 4A:
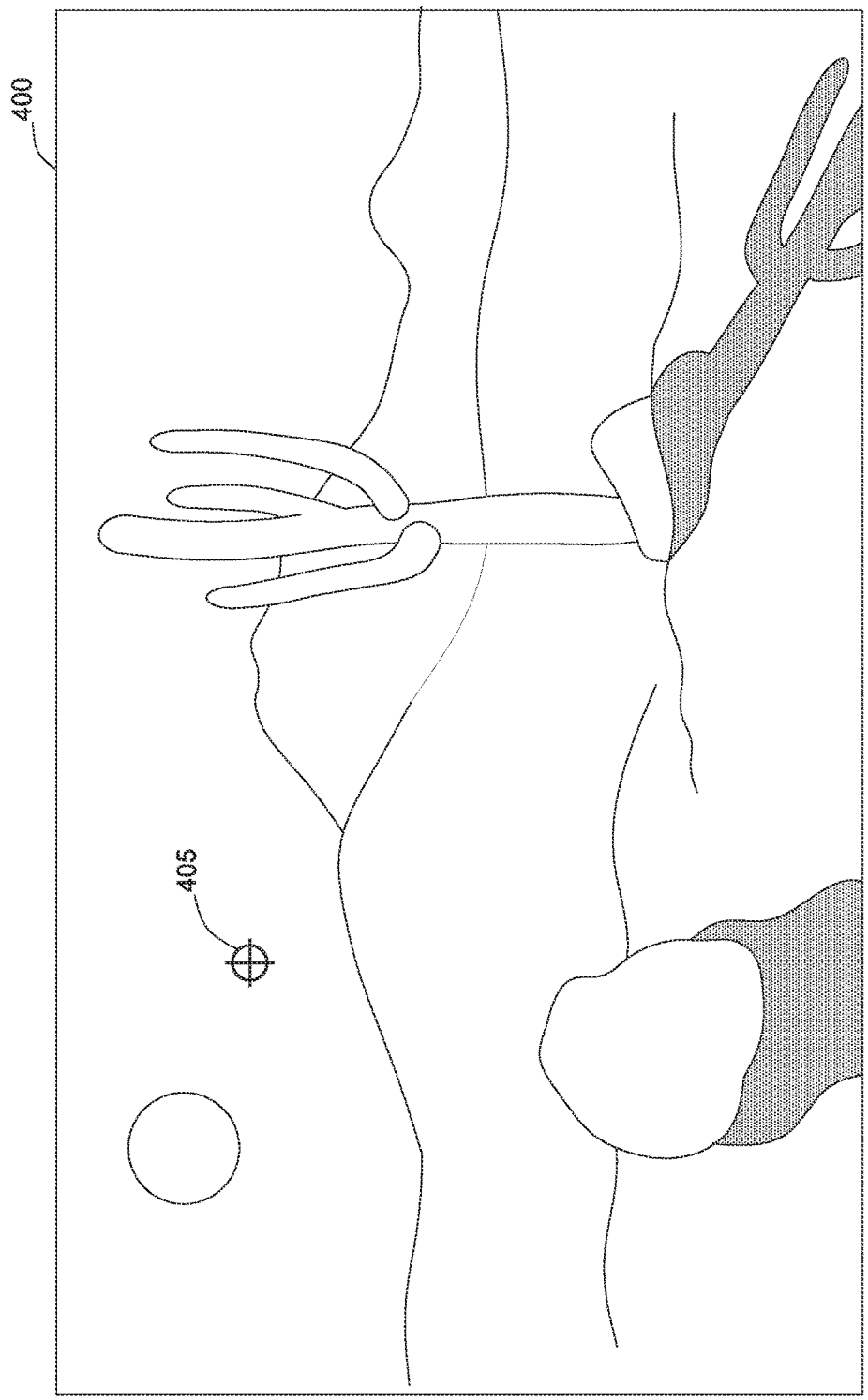
FIGS. 4A and 4B illustrate an example rendering of a 3D menu object in a geometric scene, according to one embodiment.
Figure 4B:
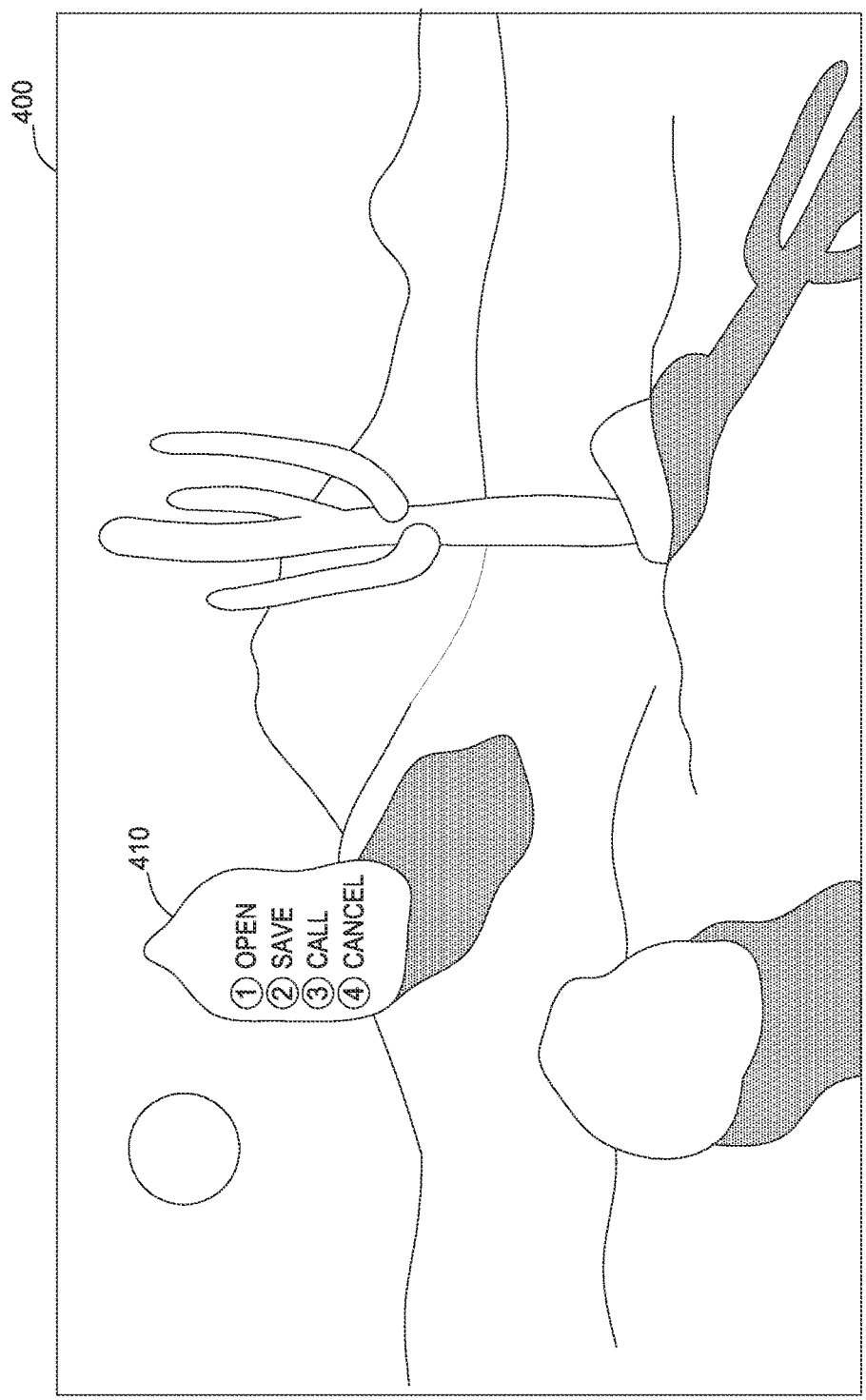

FIGS. 4A and 4B illustrate an example rendering of a 3D menu object from mid-air in a scene 400, according to one embodiment. In this example, the scene 400 represents a field-of-view (FOV) provided on the display 110 of the computing device 100 for a user. Illustratively, the scene 400 depicts a view of a 3D environment of a desert. The scene 400 includes several rendered 3D objects, such as a boulder and cactus.

In this example, FIG. 4A depicts the user selecting the point-of-origin 405, represented by the cross-hair, mid-air. The menu component 212 receives the selection and determines that the scene 400 is associated with a context (specified in the game logic 205). The menu component 212 then determines that the context is associated with a set of menu items. The menu component 212 retrieves the menu items and begins to render a 3D menu object from the point-of-origin 405.

FIG. 4B depicts a 3D menu object 410 rendered in the scene 400 from the selected point-of-origin. The 3D menu object 410 includes a list of selectable menu items, namely, "Open," "Save," Call," and "Cancel." In addition, the menu component 212 readjusts elements of the scene 300 to account for the appearance of the 3D menu object. Illustratively, the 3D menu object 410 casts a shadow.

Figure 5:
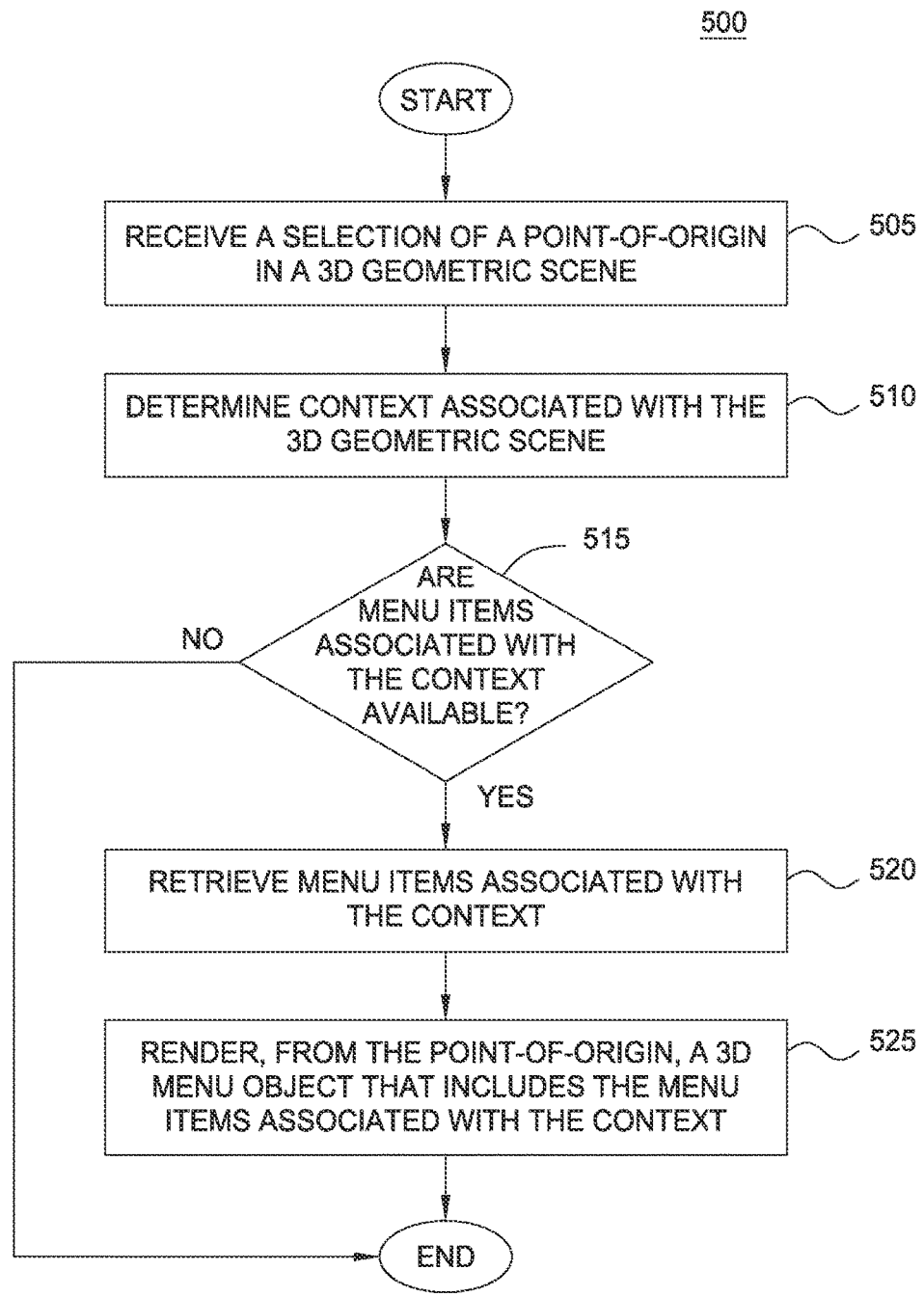
FIG. 5 illustrates a method for generating a 3D menu object in a geometric scene, according to one embodiment.

FIG. 5 illustrates a method 500 for rendering a 3D menu object in a 3D geometric scene, according to one embodiment. As shown, method 500 begins at step 505, where the menu component 212 receives a selection of a point-of-origin in a 3D geometric scene. Using scene 300 of FIG. 3A as an example, assume that the selection is at a boulder object at point-of-origin 305. However, as stated, the selection may be at any location of the scene, even if the selection is outside of an FOV of the user.

At step 510, the menu component 212 determines a context associated with the location where the point-of-origin is situated. In this example, the menu component 212 determines a context (in the game logic 205) associated with the boulder object. At step 515, the menu component 212 determines whether menu items associated with the context are available (in menu data 215). If not, then the method 500 ends.

Otherwise, if so, then at step 520, the menu component 212 retrieves the menu items associated with the context. Continuing the previous example, assume that the menu items associated with the context relate to game mechanics (e.g., save game, load game, etc.). At step 525, the menu component 212 renders a 3D menu object from the point-of-origin. As stated, if the point-of-origin is located on an existing 3D object, the menu component 212 transforms all or portions of the existing 3D object to the 3D menu object.

In this example, the menu component 212 renders a menu object 315 from a portion of the boulder object from the point-of-origin 305 using morphing techniques. Further, the menu component 212 may animate the transformation to provide a more seamless appearance to the user. The resulting 3D menu object 305 includes a user-selectable list of the retrieved menu items associated with the context. The user may engage with the menu in the scene, e.g., by selecting an option from the menu object 315, closing the menu, and the like.

If the selection of the point-of-origin is not at a given 3D object in the scene, e.g., the point-of-origin is at a mid-air location, the menu component 212 may retrieve a context associated with the location. Using scene 400 of FIG. 4 as an example, assume that the user selects a point-of-origin at 405. The menu component 212 may identify menu items associated with that context at that point-of-origin. Thereafter, the menu component 212 may render a 3D menu object from that mid-air point-of-origin 405, i.e., the 3D menu object 410. Further, the menu component 212 may present an animation sequence of the 3D menu object 410 being rendered in real time. The resulting 3D menu object 410 includes the list of identified menu items. Further, the user may engage with the menu within the scene, e.g., by selecting an option from the menu object 410, closing the menu, and the like.

In the following, reference is made to embodiments of the present disclosure. However, it should be understood that the present disclosure is not limited to specific described embodiments. Instead, any combination of the following features and elements, whether related to different embodiments or not, is contemplated to implement and practice the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the present disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A method for rendering a three-dimensional (3D) menu object in a scene, comprising:
   receiving, via a processor, a selection of a point-of-origin in a 3D geometric scene having a plurality of 3D objects, wherein the point-of-origin comprises a point on a surface of a first 3D object in the plurality of 3D objects, and wherein, prior to the selection, the first 3D object casts a shadow having a first shape;
   determining a first portion of the first 3D object to transform, the first portion corresponding to the selected point-of-origin;
   retrieving one or more predefined menu items;
   transforming the first 3D object into the 3D menu object presenting a selectable list of the one or more predefined menu items, wherein transforming the first 3D object into the 3D menu object comprises morphing one or more faces of the first 3D object that correspond to the determined first portion of the 3D object, to create the 3D menu object, wherein transforming the first 3D object further comprises morphing the shadow from the first shape into a second shape based on the 3D menu object; and
   rendering one or more images for display depicting the transformed first 3D object and the shadow having the second shape.

2. The method of claim 1, wherein prior to transforming, the first 3D object comprises an original 3D shape and wherein, after transforming, the 3D menu object comprises a transformed 3D shape different from the original 3D shape.

3. The method of claim 2, the method further comprising:
   receiving, from a user, a selection of one of the one or more predefined menu items;
   transforming the 3D menu object back into the first 3D object such that the first 3D object comprises the original 3D shape; and
   rendering one or more images for display depicting the first 3D object.

4. The method of claim 3, further comprising, during the transformation of the first 3D object to the 3D menu object:
   presenting an animated sequence of the first 3D object being transformed to the 3D menu object.

5. The method of claim 1, further comprising:
   readjusting rendered elements of each of the plurality of 3D objects relative to the 3D menu object, wherein the rendered elements include at least one of lighting elements, physics elements, and geometric elements.

6. The method of claim 1, wherein the one or more predefined menu items is associated with a context at the point-of-origin.

7. The method of claim 1, wherein the 3D geometric scene comprises an augmented reality scene, such that the plurality of 3D objects are rendered over a physical scene, and wherein receiving the selection of the point-of-origin comprises receiving an input selection from an unaided hand of a user.

8. A non-transitory computer-readable storage medium storing instructions, which, when executed on a processor, perform an operation for rendering a three-dimensional menu object in a scene, comprising:
   receiving, via the processor, a selection of a point-of-origin in a 3D geometric scene having a plurality of 3D objects, wherein the point-of-origin comprises a point on a surface of a first 3D object in the plurality of 3D objects, and wherein, prior to the selection, the first 3D object casts a shadow having a first shape;
   determining a first portion of the first 3D object to transform, the first portion corresponding to the selected point-of-origin;
   retrieving one or more predefined menu items;
   transforming the first 3D object into the 3D menu object presenting a selectable list of the predefined one or more menu items, wherein transforming the first 3D object into the 3D menu object comprises morphing one or more faces of the first 3D object that correspond to the determined first portion of the 3D object, to create the 3D menu object, wherein transforming the first 3D object further comprises morphing the shadow from the first shape into a second shape based on the 3D menu object; and
   rendering one or more images for display depicting the transformed first 3D object and the shadow having the second shape.

9. The computer-readable storage medium of claim 8, wherein prior to transforming, the first 3D object comprises an original 3D shape and wherein, after transforming, the 3D menu object comprises a transformed 3D shape different from the original 3D shape.

10. The computer-readable storage medium of claim 9, the operation further comprising:
  receiving, from a user, a selection of one of the one or more predefined menu items;
  transforming the 3D menu object back into the first 3D object such that the first 3D object comprises the original 3D shape; and
  rendering one or more images for display depicting the first 3D object.

11. The computer-readable storage medium of claim 10, wherein the operation further comprises, during the transformation of the first 3D object to the 3D menu object:
  presenting an animated sequence of the first 3D object being transformed to the 3D menu object.

12. The computer-readable storage medium of claim 8, wherein the operation further comprises:
  readjusting rendered elements of each of the plurality of 3D objects relative to the 3D menu object, wherein the rendered elements include at least one of lighting elements, physics elements, and geometric elements.

13. The computer-readable storage medium of claim 8, wherein the one or more predefined menu items is associated with a context at the point-of-origin.

14. The computer-readable storage medium of claim 8, wherein the 3D geometric scene comprises an augmented reality scene, such that the plurality of 3D objects are rendered over a physical scene, and wherein receiving the selection of the point-of-origin comprises receiving an input selection from an unaided hand of a user.

15. A system, comprising:
a processor; and
a memory storing an application, which, when executed on the processor, performs an operation for rendering a three-dimensional menu object in a scene comprising:
  receiving, via the processor, a selection of a point-of-origin in a 3D geometric scene having a plurality of 3D objects, wherein the point-of-origin comprises a point on a surface of a first 3D object in the plurality of 3D objects, and wherein, prior to the selection, the first 3D object casts a shadow having a first shape;
  determining a first portion of the first 3D object to transform, the first portion corresponding to the selected point-of-origin;
  retrieving one or more predefined menu items;
  transforming the first 3D object into the 3D menu object presenting a selectable list of the predefined one or more menu items, wherein transforming the first 3D object into the 3D menu object comprises morphing one or more faces of the first 3D object that correspond to the determined first portion of the 3D object, to create the 3D menu object, wherein transforming the first 3D object further comprises morphing the shadow from the first shape into a second shape based on the 3D menu object; and
  rendering one or more images for display depicting the transformed first 3D object and the shadow having the second shape.

16. The system of claim 15, wherein prior to transforming, the first 3D object comprises an original 3D shape and wherein, after transforming, the 3D menu object comprises a transformed 3D shape different from the original 3D shape.

17. The system of claim 15, the operation further comprising:
  receiving, from a user, a selection of one of the one or more predefined menu items;
  transforming the 3D menu object back into the first 3D object such that the first 3D object comprises the original 3D shape; and
  rendering one or more images for display depicting the first 3D object.

18. The system of claim 15, wherein the operation further comprises:
  readjusting rendered elements of each of the plurality of 3D objects relative to the 3D menu object, wherein the rendered elements include at least one of lighting elements, physics elements, and geometric elements.

19. The system of claim 15, wherein the one or more predefined menu items is associated with a context at the point-of-origin.

20. The system of claim 15, wherein the 3D geometric scene comprises an augmented reality scene, such that the plurality of 3D objects are rendered over a physical scene, and wherein receiving the selection of the point-of-origin comprises receiving an input selection from an unaided hand of a user.

* * * * *